(12) United States Patent
Weckwerth et al.

(10) Patent No.: US 8,965,214 B2
(45) Date of Patent: Feb. 24, 2015

(54) MANUFACTURING SYSTEM AND METHOD USING IR COMMUNICATIONS LINK

(75) Inventors: Mark V. Weckwerth, Pleasanton, CA (US); Harvey I. Liu, Fremont, CA (US); Tobin C. Island, Oakland, CA (US); Robert E. Grove, Pleasanton, CA (US)

(73) Assignee: Tria Beauty, Inc., Dublin, CA (US)

( * ) Notice: Subject to any disclaimer, the term of this patent is extended or adjusted under 35 U.S.C. 154(b) by 1363 days.

(21) Appl. No.: 12/137,263

(22) Filed: Jun. 11, 2008

(65) Prior Publication Data

US 2008/0310836 A1    Dec. 18, 2008

Related U.S. Application Data

(60) Provisional application No. 60/944,080, filed on Jun. 14, 2007.

(51) Int. Cl.
*H04B 10/00* (2013.01)
*H04B 10/114* (2013.01)

(52) U.S. Cl.
CPC ................................ *H04B 10/1143* (2013.01)
USPC ............ 398/118; 398/130; 398/131; 398/156

(58) Field of Classification Search
USPC ......... 398/128, 130, 135, 138, 131, 129, 156, 398/151, 195, 25, 33, 38, 106, 119, 123, 398/136, 137, 162, 167, 122, 118, 139, 140, 398/153, 164, 165, 9, 16, 22, 23, 24, 182
See application file for complete search history.

(56) References Cited

U.S. PATENT DOCUMENTS

| | | | |
|---|---|---|---|
| 4,240,738 A | 12/1980 | Praamsma | |
| 4,837,568 A * | 6/1989 | Snaper | 340/10.52 |
| 5,295,052 A | 3/1994 | Chin et al. | |
| 6,536,914 B2 | 3/2003 | Hoelen et al. | |
| 6,944,402 B1* | 9/2005 | Baker et al. | 398/128 |
| 7,068,910 B2 | 6/2006 | Duine et al. | |
| 7,274,876 B2* | 9/2007 | Gerszberg et al. | 398/115 |
| 7,330,661 B1* | 2/2008 | Jackson et al. | 398/118 |
| 7,565,082 B2* | 7/2009 | Yazaki et al. | 398/129 |
| 7,792,425 B2* | 9/2010 | Aronson et al. | 398/30 |
| 2001/0046131 A1 | 11/2001 | Hoelen et al. | |
| 2003/0080755 A1 | 5/2003 | Kobayashi | |
| 2004/0037566 A1* | 2/2004 | Willebrand et al. | 398/115 |
| 2004/0120151 A1 | 6/2004 | Ostler et al. | |
| 2005/0276072 A1 | 12/2005 | Hayashi et al. | |
| 2006/0206103 A1 | 9/2006 | Altshuler et al. | |
| 2007/0014415 A1* | 1/2007 | Harrison et al. | 380/278 |
| 2007/0129711 A1 | 6/2007 | Altshuler et al. | |
| 2007/0223930 A1* | 9/2007 | Ternullo et al. | 398/128 |

* cited by examiner

*Primary Examiner* — M. R. Sedighian
(74) *Attorney, Agent, or Firm* — King & Spalding L.L.P.

(57) ABSTRACT

An automated test system for testing devices being manufactured comprises an infrared communications link for free space communications between a host and a device under test. The communications link is asymmetric and instructions from the host are acknowledged by the device. The instructions cause the device to operate, and the output of the device is monitored, logged, and compared to acceptance criteria. The host can then generate calibration messages to the device, to change the device operating characteristics as appropriate. The communications link uses an unmodulated data stream together with asynchronous handshaking and a robust checksum algorithm to ensure accurate communication.

16 Claims, 6 Drawing Sheets

Fig. 4 Error correcting software data packet protocol. Both the transmitting packet from the sender and the acknowledging packet from the receiver contain the identical transmit ID (TID) for rejecting erroneous communication.

Fig. 5 Automated testing

Figure 6

MANUFACTURING SYSTEM AND METHOD USING IR COMMUNICATIONS LINK

RELATED APPLICATION

This application claims the benefit of provisional U.S. patent application Ser. No. 60/944,080, filed on Jun. 14, 2007, and incorporated herein by reference.

FIELD OF THE INVENTION

The present invention is generally related to manufacturing systems, and more particularly is related to manufacturing systems using a wireless link to communicate with a device under test.

BACKGROUND OF THE INVENTION

The concept of using communications in the manufacturing process is well known. However, most communications techniques used in manufacturing involve the use of connectors between the system monitoring the manufacturing and the device being manufactured.

Such an approach is impractical if the device being manufactured needs to be tested in as close to real-world operating conditions as possible. For example, if the performance of the device might change if the device were opened sufficiently as to connect a sensing device physically, the use of a connector becomes an unacceptable approach, but the prior art has not fully addressed this problem.

Further, for devices requiring calibration during manufacture, the prior art typically has required a port in the device by which a connector can be physically attached to the device to permit control by the manufacturing system. For devices which have no external port, the approach of using a physical connection is unworkable, and another solution is required. For such devices, it is desirable that the communication system include a wireless link between the host system and the DUT. It is also desirable that such a communication system minimizes the cost added to each individual device as the result of testing.

In addition, the ability to log performance data for a device being manufactured, and therefore to be able to track a device's entire manufacturing history, without ever physically connecting a monitoring system to the device, has not been possible in the prior art.

As a result, there has been a need for a system and method by which a device under test can be sealed so as to operate in conditions essentially identical to real world conditions, and at the same time able to respond to provide to the manufacturing system full data concerning the performance of the device, while also being able to respond to calibration instructions from the manufacturing system. And, of course, the communications link that provides all of these features must be inexpensive, but must also be reliable and operable by manufacturing personnel without extensive training.

SUMMARY OF THE INVENTION

In the high volume manufacturing of low-cost devices with high degree of complexity and stringent quality control requirement, it is very desirable to have 100% device testing with automated manufacturing test tool. An example is the manufacturing of portable medical devices. To permit a desired level of automation, the system requires some form of communication system which links a computer-controlled host test tool and a device under test (DUT).

The present invention provides a substantially automatic test system for performing, among other things, data gathering, quality assurance and device certification testing. In an aspect of the invention, an asymmetric infrared (IR) optical communications link is provided to permit communication between the manufacturing host test tools and the DUT. In an embodiment of this asymmetric system, all the communication complexity is shifted to the host test tool hardware and the communication control software, which resides in both the DUT and the host computer. This technique allows one to minimize the complexity of the device communication hardware and therefore the device unit cost.

In order to realize the full benefit of the automated testing, it is desirable to have a host test fixture that easily aligns the optical IR communication link between the transceivers of the host test tool and the DUT.

The device under test is then operated under the control of the manufacturing system, with communications flowing from the manufacturing system to the device and the device responding by generating the outputs appropriate for that specific device. The outputs are logged and compared with expected results, and the host can then calibrate the outputs to ensure that they are within specifications.

These and other aspects of the present invention will be better appreciated from the following detailed description of the invention, taken in combination with the appended Figures.

DETAILED DESCRIPTION OF THE INVENTION

Figure 1:
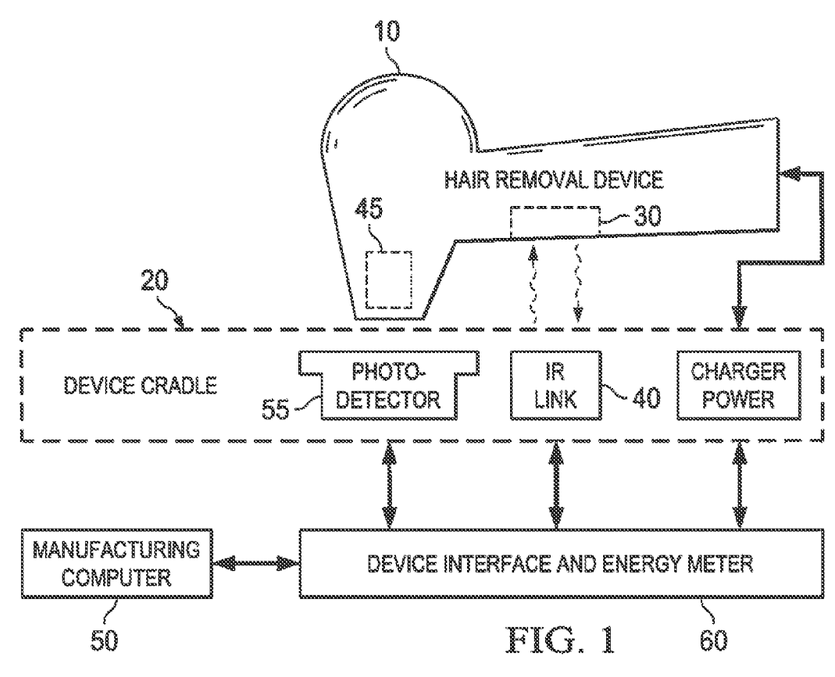
FIG. 1 illustrates a manufacturing system in accordance with the present invention.
Figure 2:
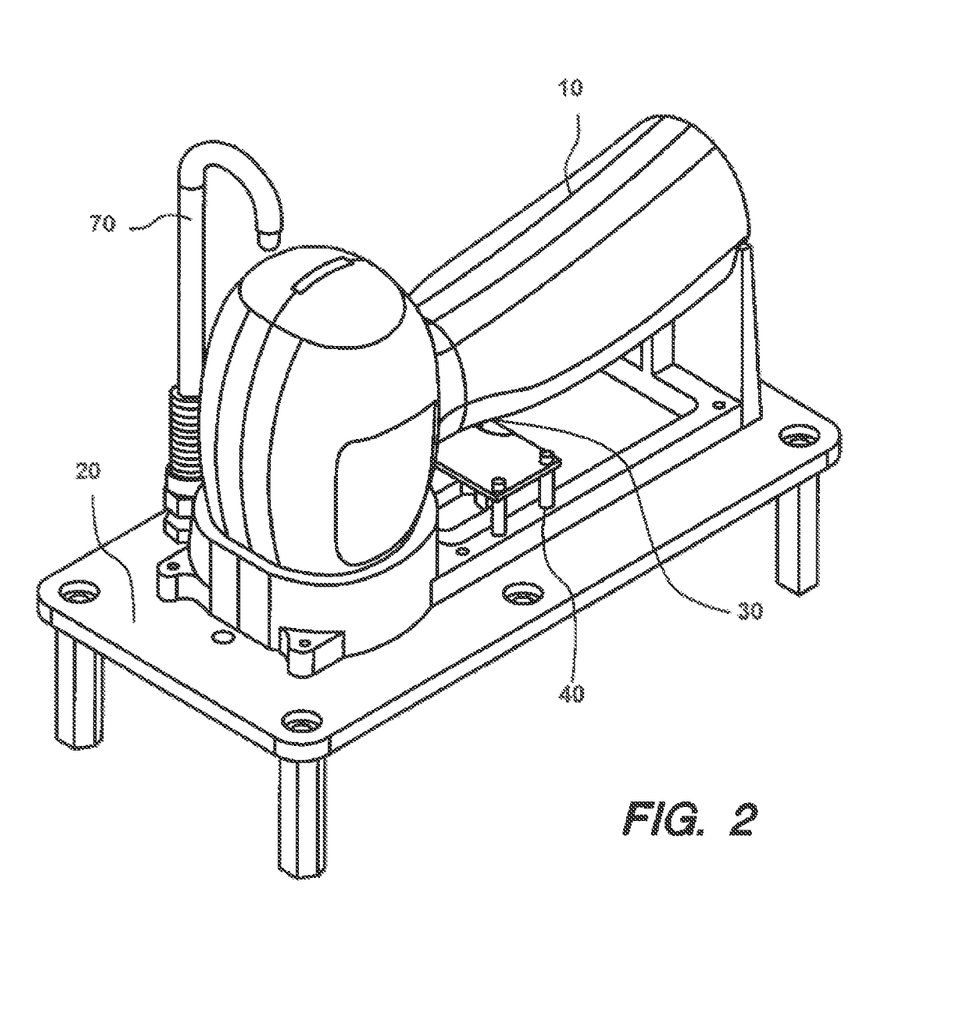
FIG. 2 illustrates a test cradle into which a device under test (DUT) has been placed.

An embodiment of a manufacturing system and a mechanical alignment fixture in accordance with the invention is shown in FIGS. 1 and 2. The DUT 10 can be easily placed into the test fixture, or test cradle 20, such that the optical transceiver 30 of the DUT 10 is aligned with the host transceiver 40 in the cradle 20 and the laser radiation source 45 provided in a head of the DUT is aligned with a photo-detector 55. This not only improves the communication link's signal to noise ratio but also makes performing the automated testing very simple. One simply sets the DUT 10 into the test cradle 20 and then initiates the entire automated testing sequence, typically through operation of a computer program running on a host computer system 50. After completion of the test, the device can be easily removed from the test fixture. The test fixture can be equipped with appropriate devices for performing measurements appropriate to the DUT 10. For example, for a laser-based hair removal device, an optical power meter 60 and a temperature sensor 70 can be provided to provide data to the host system to permit the host computer system 50 to synchronize with events in the DUT. In an embodiment, all commands from the host system to the DUT are passed from the host system to the DUT through the IR link in the cradle and DUT. In an embodiment, all the controls are made possible by the asymmetric IR communication link.

Figure 3:
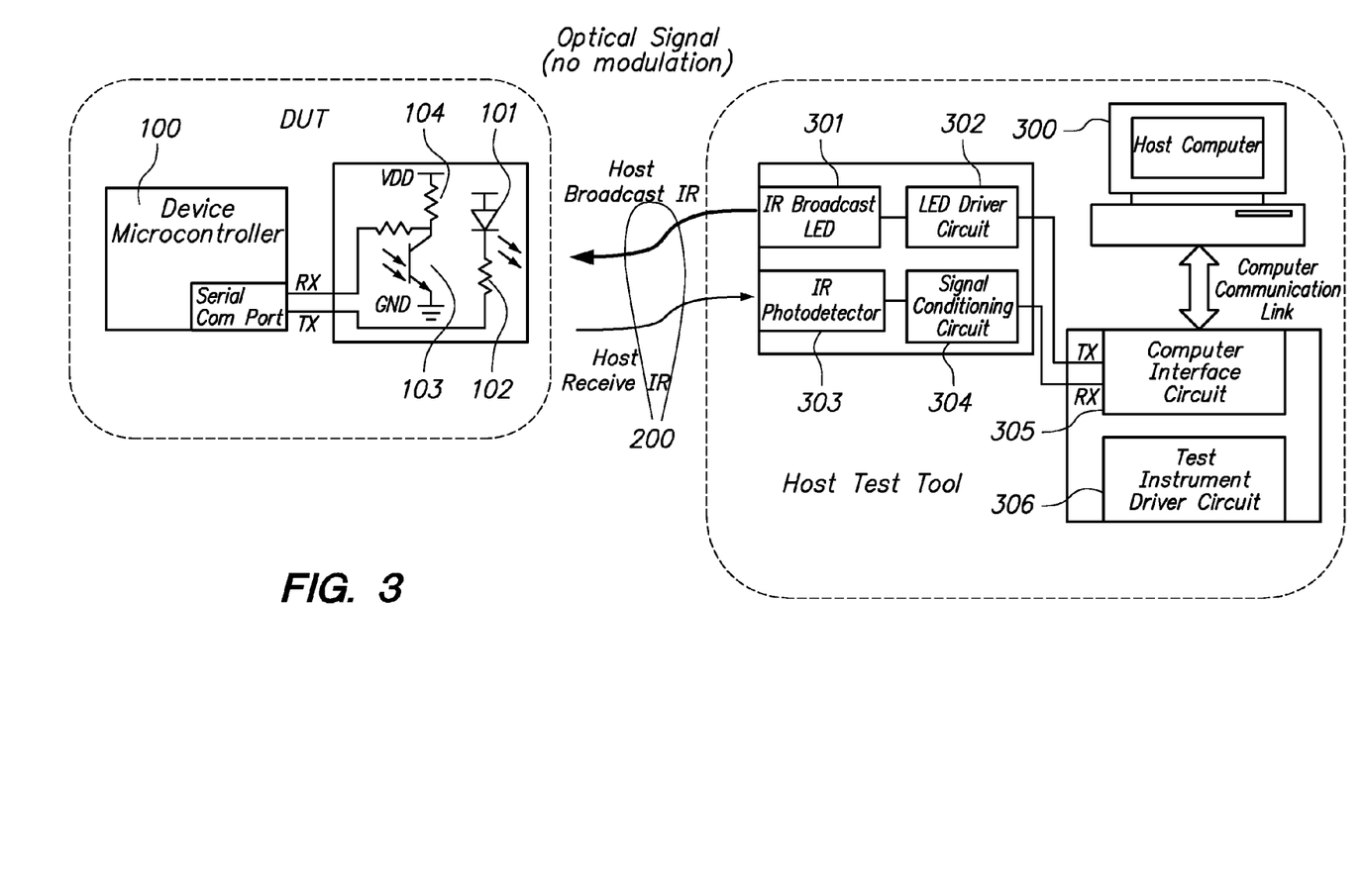
FIG. 3 illustrates an IR communications link between a host system and a DUT.

An embodiment of the asymmetric IR communication hardware function block is shown in FIG. 3. On the device side, the communication optical transceiver is very simple. It comprises a single small IR LED (Light Emitting Diode) emitter 101 with its loading resistor 102 and a single small phototransistor receiver 103 with its current sense resistor 104. This simple optical transceiver is directly connected to the communication port of the device microcontroller 100. To further simplify the device side communication support, the serial data electronic signal is directly encoded onto the optical signal 200 without using any modulation technique such as a carrier frequency. Thus there is no need for any demodulation hardware for the device to obtain the baseband data.

The optical signal is free-space coupled to the host test tool in the drop-in cradle fixture that mechanically aligns the optical transceivers of the DUT and the host tool to within a short range. For the illustrated embodiment, on the host test tool side, the optical transceiver circuit is significantly more complex to accommodate the weak optical signal and the poor detection sensitivity from the device side. There is a significantly higher power broadcast LED 301 with a higher current drive circuit 302 to "talk" to, or transmit signals to, the device. There is also a more complex photo-detector 303 with additional electronic signal conditioning circuit 304 to "listen" to, or receive signals from, the device. The conditioned signals are hardwired to a test electronics system that performs the appropriate signal level shifting 305 to interface with the host computer 300. The test electronics system also comprises other instrument drivers 306 for coordinating the automated testing tasks. The entire automation sequence is directed by the host software in the control computer 300.

For at least some embodiments of the manufacturing system, it is desirable to have a more reliable communications link than can be provided by the hardware asymmetry alone. Due to the weak and un-modulated optical signal from the simple device transceiver, the interference from the ambient lighting can cause occasional data corruption. In such embodiments, it is desirable to also have a robust communication software protocol to create a fault free link. One embodiment of a suitable error correction protocol is outlined in FIG. 4.

Figure 4:
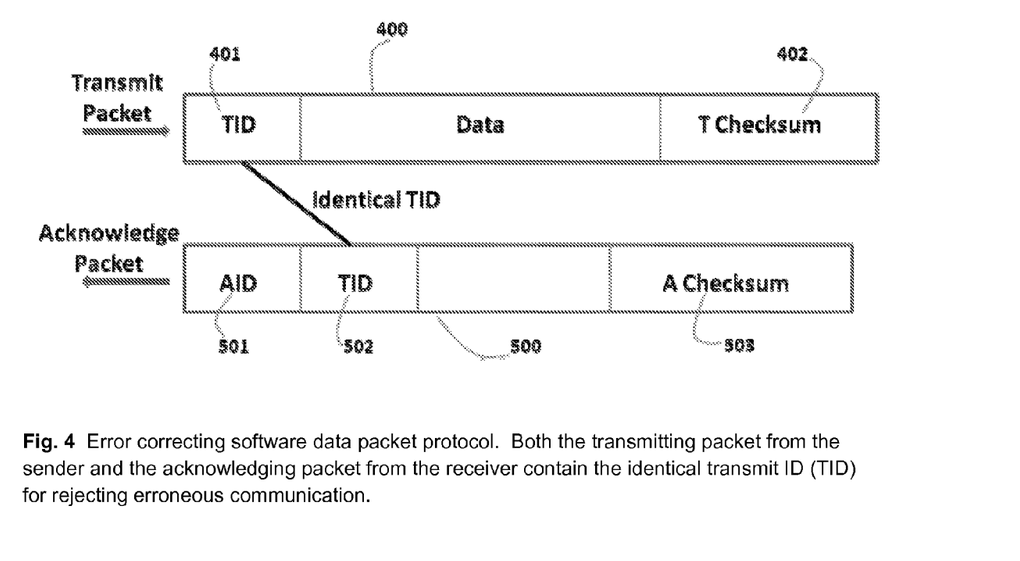
FIG. 4 illustrates one example of a communications protocol for use with the IR link.

In this scheme, the communication data integrity is accomplished by a sequence of asynchronous "handshaking" between the host computer and the DUT. The same protocol resides in both the host and the DUT. Each transmitting message is encoded in a data packet 400 with a leading transmitting ID (TID) 401. Each data packet is also terminated with a set of robust checksum bytes 402 computed from the entire data packet byte values using an algorithm such as a 32-bit CRC checksum. Upon successfully receiving the transmitting data packet with the proper checksum value, the receiver transmits an acknowledging data packet 500 back to the sender. This acknowledging data packet also contains a leading acknowledging ID (AID) 501 followed by the original TID 502. It also ends with a checksum 503 for the acknowledging data packet. Once this is received back at the sender, the packet integrity checksum and the original TID will be verified against the expected values. If verified, the sender knows that the receiver has successfully received the original transmitted message. The sender will increment the TID after a successful transmission. If there is no successful acknowledging data packet received within a certain set duration, the sender will not increment the TID of the original transmitting data packet and will attempt again to send the same data packet again. This repeats until a successful acknowledging packet is received or the entire process times out.

The asymmetric optical transceiver communication hardware in combination with the error correcting software resides in both the host test tool and the device under test enables fully automated manufacturing testing and qualification of a complex product. This is especially well suited for high volume manufacturing of medical devices with potential safety risk that requires individual software configuration and rigorous safety certification.

Figure 5:
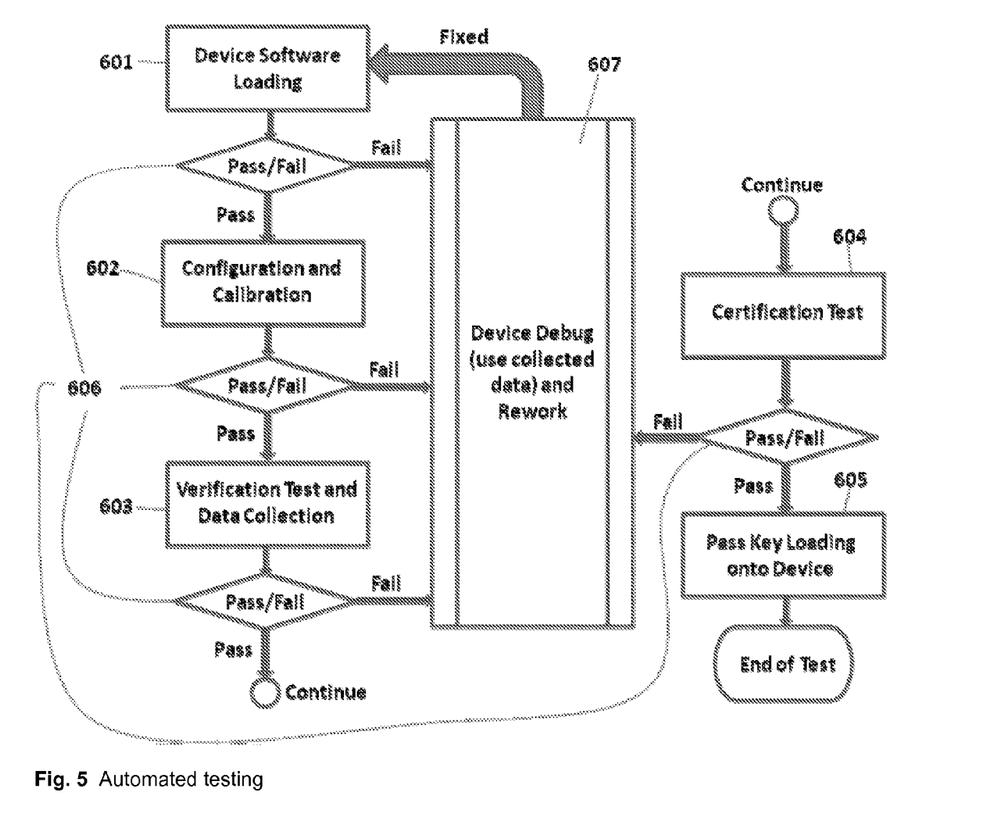
FIG. 5 illustrates an example of a process for performing automated testing for data gathering, calibration and certification of a DUT in accordance with the present invention.
Figure 6:
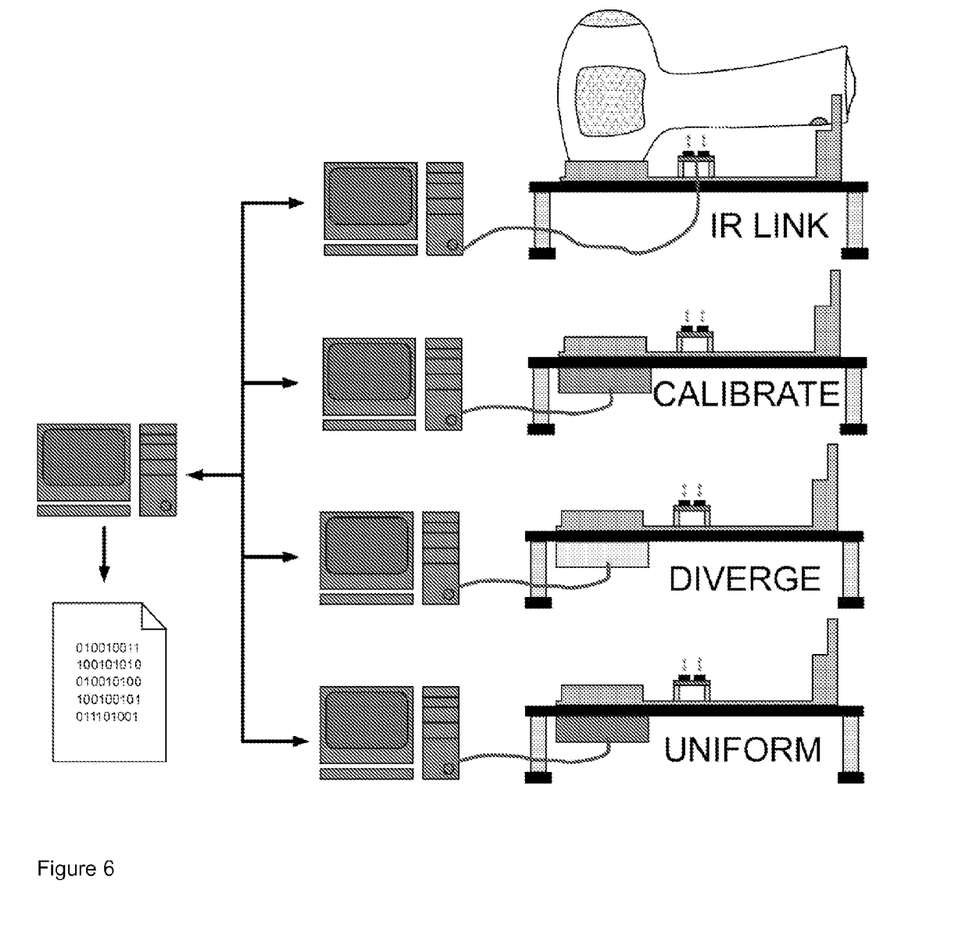
FIG. 6 illustrates a system for performing the method of FIG. 5.

An example is a portable cosmetic laser treatment device. An embodiment of a manufacturing test process flow chart is shown in FIG. 5, and a corresponding system diagram is shown in FIG. 6. When the simple low-cost simple optical transceiver is integrated directly onto each device's control electronics, the device can be set in a manufacturing test cradle to perform a series of computer controlled automated tasks, including device software programming 601, optical output calibration 602, thermal performance verification 603, an optical beam quality characterization, and laser safety certification 604. During optical output calibration, the host processor causes the device to emit a pulse of light (see FIG. 1, laser radiation source 45), and then measures that output (see FIG. 1, photo-detector 55 and optical power meter 60). If the output does not meet the specifications, the host then adjusts the operating parameters of the device via the IR communication link, causes another pulse to be emitted, and so on until the device is within specification. The final device parameters, specific to that device and determined with the device fully assembled and operating, are then stored in the device for use during field operation.

At each testing step, data from the test is collected which provides a complete history for each DUT. The host computer automatically determines the pass/fail status based on the data collected 606. If a failure is detected, the device can be debugged using the data collected from the device through the IR link and then returned to assembly for rework. If the DUT requires a certification, such as a certification that the device complies with a particular laser class, for example, the standards set forth in 21 CFR 1040.10 or IEC 60825-1, a certified pass key can also be loaded onto the device automatically after the DUT completes the appropriate testing successfully. Thus, in the present invention, the key manufacturing steps of (1) device configuration and data collection, (2) quality assurance, and (3) certification are all automatically controlled and coordinated by the host computer through the asymmetric IR communication link.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A system providing an infrared communications link between a host system and a portable device, the system comprising:
  a portable device comprising:
    a first optical transmitter,
    a first optical receiver, and
    a laser radiation source configured to emit laser radiation test pulses,
  a host system comprising:
    a cradle configured to physically receive the portable device, the cradle comprising:
      a second optical transmitter, a second optical receiver, and
a photodetector configured to detect the laser radiation test pulses from the laser radiation source of the portable device,
wherein the cradle is configured to:
physically align the first optical receiver and second, optical transmitter as a first pair for free space communication, and the second optical receiver and first optical transmitter being aligned as a second pair for free space communication, and
locate the photodetector relative to the portable device to detect test pulses emitted by the laser radiation source of the portable,
testing electronics configured to analyze laser radiation test pulses emitted by the laser radiation source and detected by the photodetector, and
a signal generator for generating data signals including identification data, encoding the data signals onto an optical signal, and transmitting the encoded data signals via the second optical transmitter of the cradle to the first optical receiver of the portable device.

2. The system of claim 1, further comprising asynchronous handshaking between the host and the portable device.

3. The system of claim 1, wherein the encoded data signal comprises at least one data packet having a leading transmitting ID.

4. The system of claim 3, wherein the portable device responds to receipt of the at least one data packet with, a data signal comprising at least an acknowledging ID.

5. The system of claim 1, wherein communications between the host and the portable device are asymmetric.

6. The system of claim 1,
wherein the first optical transmitter and the first optical receiver of the portable device and the second optical transmitter and the second optical receiver of the host system form an infrared communications link between the portable device and the host system; and
wherein the host system is configured to detect and analyze one or more laser radiation test pulses from the laser radiation source of the portable device, and cause one or more adjustments of the operation of the laser radiation source based on the analysis of the one or more laser radiation test pulses.

7. The system of claim 6, wherein the host system and the portable device are configured to perform an identification process that includes communicating and evaluating identification data.

8. The system of claim 1, wherein the signal generator is configured to generate and transmit, via the second optical transmitter of the cradle and to the first optical receiver of the portable device, data signals including at least one of an instruction to emit a laser radiation test pulse and an instruction to adjust at least one operating parameter of the portable device.

9. The system of claim 1, wherein the testing electronics of the host device are configured to analyze laser radiation test pulses emitted by the laser radiation source and detected by the photodetector for at least one of optical output characterization, thermal performance verification, optical beam quality characterization, and laser safety certification.

10. The system of claim 1, wherein:
the testing electronics of the host device are configured to analyze laser radiation test pulses emitted by the laser radiation source and detected by the photodetector for evaluation of a laser class certification, and
the signal generator of the host system is configured to communicate data to the portable device indicating the evaluated laser class certification, and
the portable device is configured to receive and store the data indicating the evaluated laser class certification.

11. A system providing an infrared communications link between a host system and a portable device, the system comprising:
a portable device comprising:
a first optical transmitter,
a first optical receiver, and
a radiation source distinct from the first optical transmitter and configured to emit test radiation pulses,
a host system comprising:
a cradle configured to physically receive the portable device, the cradle comprising:
a second optical transmitter,
a second optical receiver, and
a photodetector configured to detect the test radiation pulses from the radiation source of the portable device,
wherein the cradle is configured to:
physically align the first optical receiver and second optical transmitter as a first pair for free space communication, and the second optical receiver and first optical transmitter being aligned as a second pair for free space communication, and
locate the photodetector relative to the portable device to detect test pulses emitted by the laser radiation source of the portable device,
testing electronics configured to analyze test radiation pulses emitted by the radiation source and detected by the photodetector,
a signal generator for generating a data signal, encoding the data signal onto an optical signal, and transmitting the encoded data signal via the second optical transmitter of the cradle to the first optical receiver of the portable device,
the portable device further comprising a controller for receiving and interpreting the encoded data signal and causing the portable device to operate in response thereto, and
wherein the host system and the portable device are configured to perform a handshaking process with each other that includes communicating and evaluating identifier data.

12. The system of claim 11, wherein:
the host system is configured to detect and analyze one or more test radiation pulses from the radiation source of the portable device, and cause one or more adjustments of the operation of the radiation source based on the analysis of the one or more test radiation pulses.

13. The system of claim 11, wherein the testing electronics of the host device are configured to analyze laser radiation test pulses emitted by the radiation source and detected by the photodetector for at least one of optical output characterization, thermal performance verification, optical beam quality characterization, and laser safety certification.

14. The system of claim 11, wherein:
the testing electronics of the host device are configured to analyze laser radiation test pulses emitted by the radiation source and detected by the photodetector for evaluation of a laser class certification, and
the signal generator of the host system is configured to communicate data to the portable device indicating the evaluated laser class certification, and the controller of the portable device is configured to receive and store the data indicating the evaluated laser class certification.

15. A system providing a wireless communications link between a host system and a portable device, the system comprising
- a portable device comprising:
  - a first optical transmitter, and
  - a first optical receiver,
- a host system comprising;
  - a second optical transmitter,
  - a second optical receiver, and
  - a physical structure configured to physically align the first optical receiver and second optical transmitter as a first pair for free space wireless communication, and the second optical receiver and first optical transmitter being aligned as a second pair for free space wireless communication,
- wherein the portable device further comprises a signal generator for generating data signals, encoding the data signals onto an optical signal using baseband, no-carrier signaling without modulation, and transmitting the encoded unmodulated data signals via the first optical transmitter to the second optical receiver of the host system, and
- wherein the wireless communications link between a host system and the portable device is an asymmetric communications link having at least one of the following characteristics:
  - the second optical transmitter of the host system has a significantly higher transmission power than the first optical transmitter of the portable device, and
  - the second optical receiver of the host system includes more complex signal conditioning electronics than the first optical receiver of the portable device, thereby enabling the host system to receive the lower-power transmissions of the from the portable device.

16. The system of claim 15, wherein the first optical transmitter of the portable device includes a single IR LED, and the first optical receiver of the portable device includes a single phototransistor receiver.

* * * * *